United States Patent
Mukhopadhyay et al.

(10) Patent No.: US 10,175,375 B2
(45) Date of Patent: Jan. 8, 2019

(54) METHOD AND SYSTEM FOR DIRECT SLOWNESS DETERMINATION OF DISPERSIVE WAVES IN A WELLBORE ENVIRONMENT

(71) Applicant: Halliburton Energy Services, Inc., Houston, TX (US)

(72) Inventors: Pradip Kumar Mukhopadhyay, Houston, TX (US); Batakrishna Mandal, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 135 days.

(21) Appl. No.: 15/334,091

(22) Filed: Oct. 25, 2016

(65) Prior Publication Data

US 2017/0102475 A1    Apr. 13, 2017

Related U.S. Application Data

(63) Continuation of application No. 14/394,983, filed as application No. PCT/US2012/068884 on Dec. 11, 2012, now abandoned.

(51) Int. Cl.
*G01V 1/50* (2006.01)
*G01V 1/48* (2006.01)
(Continued)

(52) U.S. Cl.
CPC ............... *G01V 1/50* (2013.01); *G01V 1/48* (2013.01); *G01V 3/08* (2013.01); *G01V 3/30* (2013.01);
(Continued)

(58) Field of Classification Search
CPC .................... G01V 1/50; G01V 2210/1299
See application file for complete search history.

(56) References Cited

U.S. PATENT DOCUMENTS

| 5,239,267 A | 8/1993 | Chemali et al. |
| 5,278,805 A * | 1/1994 | Kimball .................. G01V 1/48 367/31 |

(Continued)

FOREIGN PATENT DOCUMENTS

| WO | 00/60380 A1 | 10/2000 |
| WO | 2010/040087 A2 | 4/2010 |

OTHER PUBLICATIONS

Market, J., et al. "Dispersion Corrections Are Not Just for LWD Dipole Sonic Tools", SPE Annual Technical Conference, SPE Paper No. 102345.

(Continued)

*Primary Examiner* — Tung X Nguyen
*Assistant Examiner* — Dominic Hawkins
(74) *Attorney, Agent, or Firm* — Benjamin Fite; Baker Botts L.L.P.

(57) ABSTRACT

A system and method for effective estimation of properties of a formation using acoustic array processing is disclosed. An acoustic tool is directed to a zone of interest in the formation and generates a first signal. Real data corresponding to the first signal is then received. One or more basic parameters are provided as input. The basic parameters may include parameters relating to the acoustic tool or parameters relating to the zone of interest. A time semblance shear slowness and a frequency semblance shear slowness are determined using the basic parameters. A mask is then selected using the determined time semblance and frequency semblance shear slowness values and used to isolate a dispersion curve. A shear slowness value is selected from the dispersion curve and quality control is performed on the selected shear slowness value.

20 Claims, 5 Drawing Sheets

(51) Int. Cl.
*G01V 3/08* (2006.01)
*G01V 3/30* (2006.01)
*G01V 3/38* (2006.01)

(52) U.S. Cl.
CPC ........ *G01V 3/38* (2013.01); *G01V 2210/1299* (2013.01)

(56) References Cited

U.S. PATENT DOCUMENTS

| | | | |
|---|---|---|---|
| 5,661,696 A * | 8/1997 | Kimball | G01V 1/44 367/26 |
| 6,510,104 B1 * | 1/2003 | Ikegami | G01V 1/46 181/102 |
| 7,120,541 B2 | 10/2006 | Wang | |
| 7,660,196 B2 | 2/2010 | Saiki et al. | |
| 7,698,066 B2 * | 4/2010 | Huang | G01V 1/48 702/14 |
| 7,723,991 B2 | 5/2010 | Signorelli et al. | |
| 2004/0124841 A1 | 7/2004 | Omeragic | |
| 2004/0176911 A1 * | 9/2004 | Bratton | G01V 1/50 702/6 |
| 2004/0230389 A1 * | 11/2004 | Adler | G01V 1/30 702/66 |
| 2005/0180261 A1 * | 8/2005 | Mandal | G01V 1/48 367/31 |
| 2005/0254343 A1 * | 11/2005 | Saiki | G01V 1/36 367/31 |
| 2006/0083108 A1 * | 4/2006 | Wu | G01V 1/48 367/31 |
| 2006/0235617 A1 * | 10/2006 | Sinha | G01V 1/50 702/6 |
| 2008/0010021 A1 * | 1/2008 | Zheng | G01V 1/50 702/6 |
| 2008/0062814 A1 | 3/2008 | Prioul et al. | |
| 2008/0144439 A1 * | 6/2008 | Plona | G01V 1/34 367/69 |
| 2009/0109794 A1 * | 4/2009 | Sinha | E21B 49/006 367/35 |
| 2010/0157731 A1 * | 6/2010 | Aeron | G01V 1/30 367/38 |
| 2011/0208431 A1 * | 8/2011 | Skelt | G01V 9/00 702/7 |
| 2012/0201096 A1 * | 8/2012 | Valero | G01V 1/44 367/81 |
| 2014/0005946 A1 * | 1/2014 | Mandal | G01V 1/48 702/17 |

OTHER PUBLICATIONS

International Search Report and Written Opinion issued in related PCT Application No. PCT/US2012/068884 dated Nov. 12, 2013 (10 pages).
International Preliminary Report on Patentability issued in related PCT Application No. PCT/US2012/068884 dated Jun. 25, 2015 (7 pages).

* cited by examiner

METHOD AND SYSTEM FOR DIRECT SLOWNESS DETERMINATION OF DISPERSIVE WAVES IN A WELLBORE ENVIRONMENT

CROSS-REFERENCE TO RELATED APPLICATION

This application is a continuation of U.S. patent application Ser. No. 14/394,983, which was filed on Oct. 16, 2014 and is a National Stage Application of International Application No. PCT/US2012/068884, filed on Dec. 11, 2012, all of which are hereby incorporated by reference in their entirety.

BACKGROUND

Hydrocarbons, such as oil and gas, are commonly obtained from subterranean formations. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing necessary steps to produce and process hydrocarbons from the subterranean formation.

Modern oil field operations demand a great quantity of information relating to the parameters and conditions encountered downhole. Such information may include characteristics of the earth formations traversed by the wellbore and data relating to the diameter and configuration of the wellbore itself. The collection of information relating to conditions downhole, which commonly is referred to as "logging," can be performed by several methods, including wireline logging, measurement-while-drilling (MWD), logging-while-drilling (LWD), drillpipe conveyed logging, and coil tubing conveyed logging. A variety of logging tools are available for use with each of these methods. These logging tools may be used to perform wellbore imaging. Wellbore imaging is an important aspect of drilling and geosteering when performing subterranean operations.

One of the logging methods utilized to analyze a formation is acoustic logging. An acoustic logging tool may include an acoustic source (transmitter) and one or more receivers that may be spaced several inches or feet away from each other. An acoustic signal is transmitted by the acoustic source and received at the receivers of the acoustic tool which are spaced apart from the acoustic source. Measurements are repeated every few inches as the tool is drawn up (or down) the wellbore. The acoustic signal from the source travels through the formation adjacent the wellbore to the receiver array, and the arrival times and perhaps other characteristics of the receiver responses are recorded. Typically, compressional wave (P-wave), shear wave (S-wave), and Stoneley wave arrivals and waveforms are detected by the receivers and are processed. The processing of the data received is often accomplished uphole or may be handled in real-time in the tool itself. Regardless, the information that is recorded is typically used to determine formation characteristics such as formation slowness (the inverse of acoustic speed), from which pore pressure, porosity, and other formation property determinations can be made. In some tools, the acoustic signals may even be used to image the formation.

Different techniques may be used to process the received acoustic signals in order to obtain information regarding the formation characteristics. One of the methods used to determine compressional slowness is Slowness-Time Coherence ("STC") processing. In STC processing, the measured signal is time window "filtered" and stacked, and a semblance function is computed. The semblance function relates the presence or absence of an arrival with a particular assumed slowness and particular assumed arrival time. If the assumed slowness and arrival time do not coincide with that of the measured arrival time, the semblance takes on a smaller value. As a result, arrivals of the received waveforms manifest themselves as local peaks in a plot of semblance versus slowness and arrival time.

Acoustic array processing is one of the methods used for estimating formation properties such as, for example, compressional and/or shear slowness, using an acoustic logging tool data. However, one of the major hurdles for estimating the formation properties is the natural phenomenon of dispersive wave propagation along the wellbore. The dispersive nature of wave propagation may vary depending on the type of source excitation used to generate the waves at the acoustic source, formation type, wellbore diameter, etc. Specifically, the source of excitation may be, for example, a monopole, a dipole, or a quadrupole source. In fact, due to the dispersive nature of wave propagation, the true shear formation slowness estimation remains complicated even when utilizing advanced array processing, such as point-to-point time domain coherence analysis. Typical prior art systems estimate the slowness of the formation at higher frequencies of the acoustic signal because signal excitation is higher at these higher frequencies. A theoretical model is then used to correct the formation shear slowness. However, such theoretical models require the correct wellbore diameter, wellbore fluid properties, measured formation slowness and the tool properties as an input, making the process complicated and burdensome. It is therefore desirable to develop a method and system for effective estimation of formation properties using acoustic array processing.

BRIEF DESCRIPTION OF THE DRAWINGS

The present disclosure will be more fully understood by reference to the following detailed description of the preferred embodiments of the present disclosure when read in conjunction with the accompanying drawings, in which like reference numbers refer to like parts throughout the views, wherein.

Figure 1:
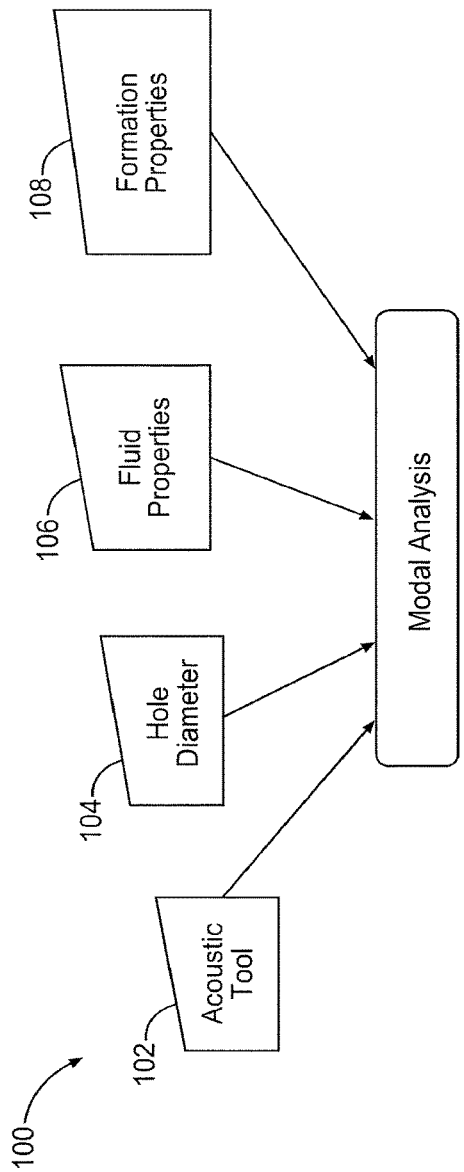
FIG. 1 depicts a system for performing modal analysis of acoustic signals in accordance with an illustrative embodiment of the present disclosure.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes which come within the meaning and range of equivalency of the claims are therefore intended to be embraced therein.

DETAILED DESCRIPTION OF THE DISCLOSURE

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; and/or any combination of the foregoing.

The term "uphole" as used herein means along the drillstring or the wellbore from the distal end towards the surface, and "downhole" as used herein means along the drillstring or the wellbore from the surface towards the distal end. The term "wellbore" as used herein refers to any hole drilled into a formation for the purpose of exploration or extraction of natural resources such as, for example, hydrocarbons. The term "strike" as used herein refers to the direction of a line formed by the intersection of the surface of an inclined bed with a horizontal plane. The term "dip" as used herein refers to the angle of slope of an inclined bed measured perpendicular to the strike and in the vertical plane, referenced to the horizontal plane.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline, MWD and LWD operations.

The present invention is directed to improving performance of subterranean operations and more specifically, to a method and system for improving estimation of formation properties when using acoustic array processing.

Turning now to FIG. 1, a system for performing modal analysis of acoustic signals propagated in a wellbore is denoted generally with reference numeral 100. A number of parameters referred to herein as "calculated parameters" are theoretically calculated. Specifically, as shown in FIG. 1, for a given acoustic tool 102 having certain acoustic tool properties, wellbore diameter 104, wellbore fluid properties (e.g., fluid velocity, density, etc.) 106 and formation properties (e.g., formation P-velocity, formation S-velocity, formation density, etc.) 108, a modal analysis is performed. Accordingly, the formation excitation (dashed curves in FIG. 2) and dipole dispersive characteristics (solid lines in FIG. 2) of the formation may be theoretically calculated. Performance of such theoretical calculations is well known to those of ordinary skill in the art having the benefit of the present disclosure and will therefore not be discussed in detail herein. FIG. 2 shows examples of such analysis for three different types of formation, namely, a fast formation (FIG. 2A), an intermediate formation (FIG. 2B) and a slow formation (FIG. 2C).

In accordance with an illustrative embodiment, an acoustic tool having an acoustic source is directed to a zone of interest in a formation. As discussed above, an acoustic signal generated with the acoustic tool travels along the wellbore as a wave. The properties of the wave travelling along the wellbore depend on the source excitation of the acoustic source. Specifically, the acoustic source may excite the wellbore in different modes. For instance, an explosion source at the center of the wellbore produces monopole or hoop mode along the wellbore. In contrast, a dipole source may produce a flexural mode along the wellbore wall, and a quadrupole mode may produce a screw mode propagating wave. In each mode, the acoustic signal traveling along the wellbore has different characteristics. Accordingly, the nature of the modal excitation is an important factor to consider when evaluating formation properties, especially when the formation velocities are slower than velocities of any fluids present in the wellbore ("wellbore fluids)". However, all modal excitations are dispersive. Accordingly, although advance array processing may be used to evaluate the formation slowness using the STC method for separating compression, shear, flexural and Stoneley waves, the estimated slowness is typically far from the actual formation slowness due to dispersion.

Figure 2C:
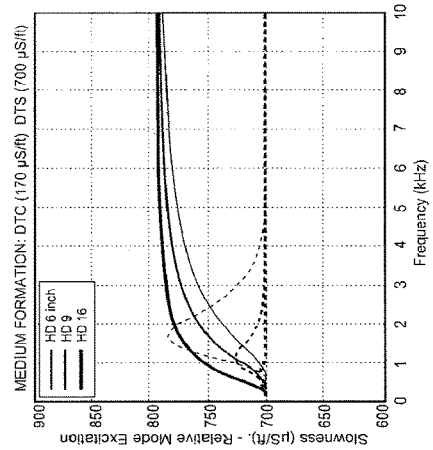
FIGS. 2A, 2B, and 2C depict examples of application of the methods disclosed herein to three different types of formations.
Figure 2B:
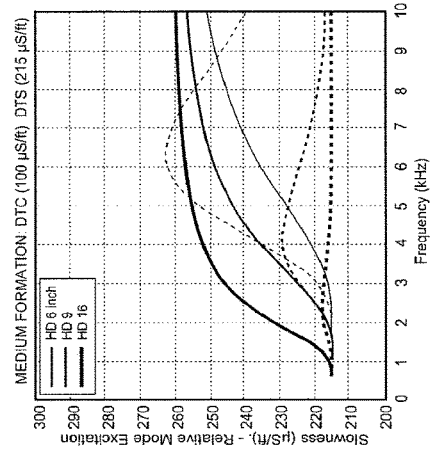
Figure 2A:
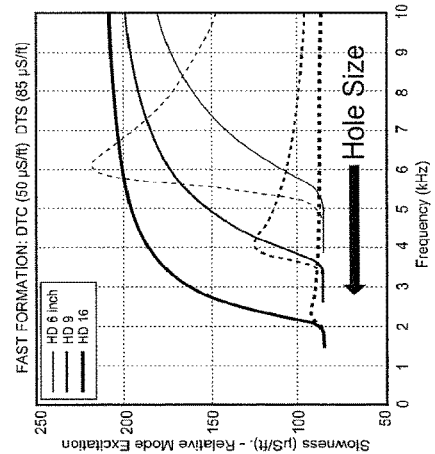

Dispersion slowness behavior and the corresponding formation excitation from a dipole source are shown in FIGS. 2A-C. As mentioned above, FIGS. 2A-C show the dispersive behavior (solid lines) of formation and relative formation excitation (dash lines) of acoustic wave propagation in a wellbore environment for different formation types. Each formation has unique properties that may be a function of the frequency of the wave propagation. At a lower frequency range, the wave may travel at a velocity close to the true formation shear velocity and formation excitation may have less power. Moreover, at a lower frequency range, the formation excitation may vary with the wellbore diameter and the lower frequency limit may shift towards the lower frequency as the wellbore diameter increases. These characteristics may be used to create a mask zone to eliminate unwanted signatures in acoustic array frequency domain analysis.

Specifically, FIGS. 2A, 2B and 2C depict examples of a fast formation, an intermediate formation, and a slow formation, respectively. In each instance, the slowness is plotted against the frequency. As shown in FIGS. 2A-C, the signal strength is higher at a higher frequency than the frequency of the true formation slowness.

In each of FIGS. 2A-C, the thickest line reflects a wellbore diameter of 16 inches, the medium thickness line reflects a wellbore diameter of 9 inches and the thinnest line reflects a wellbore diameter of 6 inches. In each plot, the modal analysis of the dipole dispersion (solid lines) and the relative formation excitation (dashed lines) of acoustic wave propagation in a wellbore are shown for each wellbore diameter. As shown in FIGS. 2A-C, each formation has unique properties with the frequency of wave propagation. The waves having lower frequencies travel close to the true formation velocity with a lower formation response. Moreover, the formation excitation is highly dependent upon the wellbore diameter. Accordingly, the characteristics of the frequency response may be used to create a mask and identify the lower asymptote of the dispersion curve in order to estimate the true formation properties using array processing.

In accordance with an embodiment of the present disclosure, the true formation velocity may be estimated by tracking the dispersion curve to the lower asymptote which is free from any other effects of the wellbore environment including the tool mode. Accordingly, model based masks are developed that can isolate the actual dispersion phenomenon for a given wellbore diameter, wellbore fluid properties and approximate formation properties. The formation properties approximated using the methods disclosed herein include, but are not limited to, formation slowness, wellbore diameter, and fluid properties within the formation. After isolating the dispersion response, an algorithm is developed to determine formation properties such as slowness. The method and system disclosed herein may be used in conjunction with real-time and/or post processing applications for wire-line, LWD or MWD environments.

Figure 3:
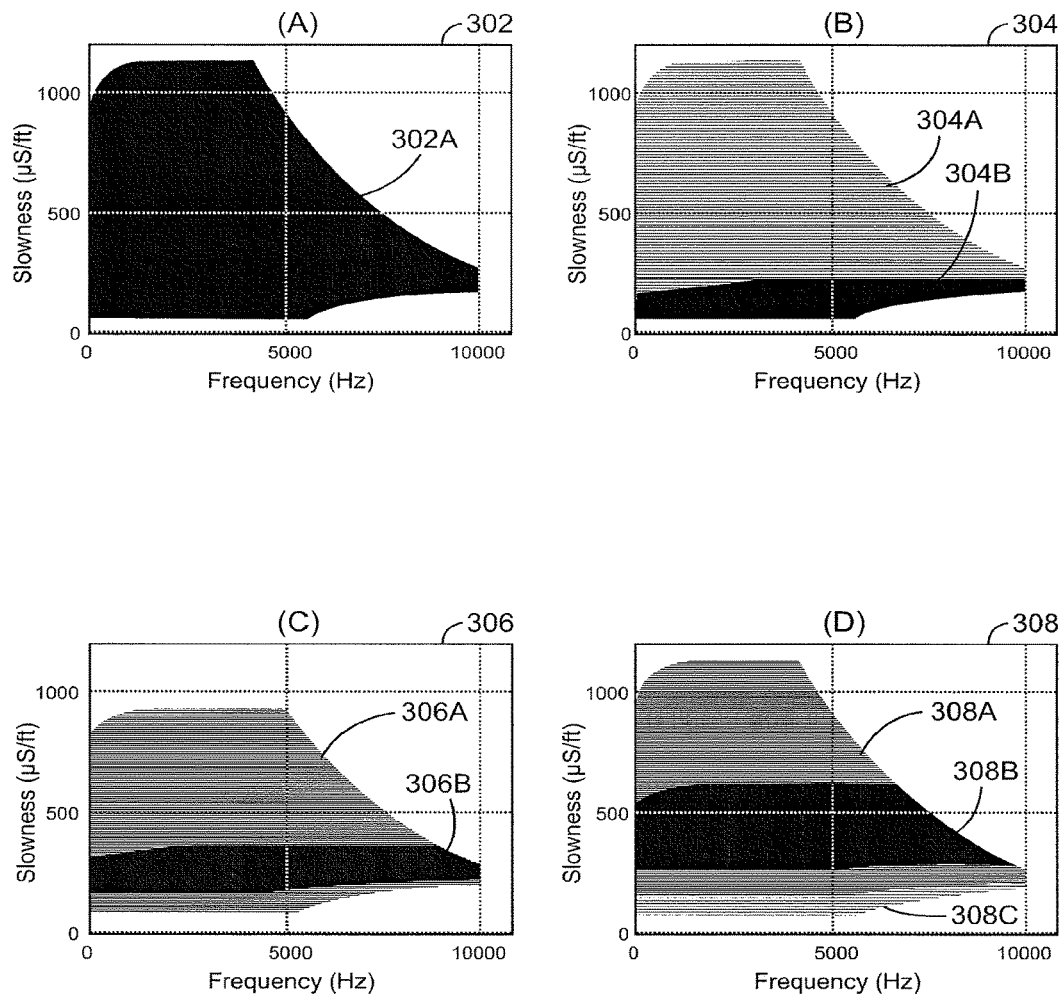
FIG. 3 depicts four maps developed in accordance with an illustrative embodiment of the present disclosure.

Turning now to FIG. 3, four maps developed in accordance with an embodiment of the present disclosure are denoted with reference numerals 302, 304, 306, and 308 and each depicts formation slowness as a function of frequency for a zone of interest in the formation being analyzed. Each map 302, 304, 306, 308 may include a number of zones. For instance, the map 302 includes one zone 302A as a primary mask. This mask 302A may be used for the initial processing step for determining the other confined zones. In contrast, the maps 304 and 306 each include a primary zone 304A, 306A and a second confined zone 304B, 306B, respectively. The primary zones 304A, 306A may be defined for the basic input parameters (formation and wellbore information) at the beginning of the processing steps. The confined zones 304B, 306B may then be established based on the data (e.g., wellbore diameter, fluid properties, formation properties, etc.) to obtain actual formation properties. Finally, the map 308 may include three zones denoted as a primary zone 308A, and two possible confined zones 308B, and 308C, especially in instances when signal quality is poor or there is uncertainty in determining the formation signals. Multiple confined zones will then be examined independently to obtain best formation information. The various zones depicted in the maps may be created from a number of theoretical dispersion curves (two layer mode) from a wide range of formation properties, wellbore diameters and fluid velocities. In the illustrative embodiment of FIG. 3, approximately 3000 theoretical dispersion curves are utilized to generate the various zones.

The zones may be used as a unique mask in a frequency semblance map to isolate an appropriate dispersion curve from the real data. While STC is performed in the time domain, frequency semblance is performed in frequency domain. The mask may be chosen adaptively so that unwanted features (e.g., tool mode, aliases, etc.) can be eliminated and correct attributes can be obtained to produce a slowness log with depth. The term "aliases" as used herein refers to the repetition of the original coherence signature. For example, in the illustrative embodiment of FIG. 3, the map 302 refers to all possible formation slownesses except the aliases and is referred to as the "Primary Mask." This zone can be used to isolate the actual dispersion response without the aliases. After isolating all possible formation slownesses and excluding the aliases, a next map may be applied to only isolate for a particular formation characteristic. For instance, as shown in FIG. 3, the confined zones 304B, 306B, 308B of the second map 304, the third map 306 and the fourth map 308 may be used to isolate for a fast formation, an intermediate formation and a slow formation, respectively. Accordingly, each of the maps 304, 306, and 308 may be a "Fast Formation Mask," an "Intermediate Formation Mask" or a "Slow Formation Mask," respectively. The selection of the masks corresponding to the fast formation, the intermediate formation and the slow formation may be performed from the slowness calculations using the time semblance method. The calculation of slowness using the time semblance method is well known to those of ordinary skill in the art and will therefore, not be discussed in detail herein.

The approximate formation slowness may be predicted from STC analysis of acoustic array data. This value may then be used to select the mask zone to eliminate unwanted signature(s) in frequency-slowness analysis results. The frequency-slowness analysis may be carried out using various methods, including, but not limited to, the Multiple Signal Classification ("MUSIC") Algorithm. The performance of such methods is well known to those of ordinary skill in the art, having the benefit of the present disclosure, and will therefore not be discussed in detail herein. (See, e.g., Schmidt, R., "MUltiple SIgnal Classification multiple-signal characterization (MUSIC) algorithm," 1986; Schmidt, R., "Multiple emitter location and signal parameter estimation," IEEE Trans. Antennas and Propagation, vol. AP-34, March 1986).

Similarly, the zones may be used as a unique mask in other Slowness-vs-Frequency methods such as, for example, Matrix Pencil and Slowness-Frequency Semblance, to isolate appropriate dispersion curves from the real data. The Matrix Pencil method may be used in signal processing to create a frequency semblance map (See, e.g., Sarkar, T. K. and Pereira, O., 1995, "Using the Matrix Pencil Method to Estimate the Parameters of a Sum of Complex Exponentials," I.E.E.E. Antennas and Propagation Magazine, 37(1), pp. 48-55). Similarly, Slowness-Frequency-Semblance is another effective method used in signal processing to create a semblance map. (See, e.g., US 2006/7089119 B2). These methods are well known to those of ordinary skill in the art, having the benefit of the present disclosure and will therefore not be discussed in detail herein. The mask may be chosen adaptively so that the unwanted features (e.g., tool mode, aliases, etc.) can be eliminated and correct attributes can be obtained to produce a slowness log with depth.

Figure 4:
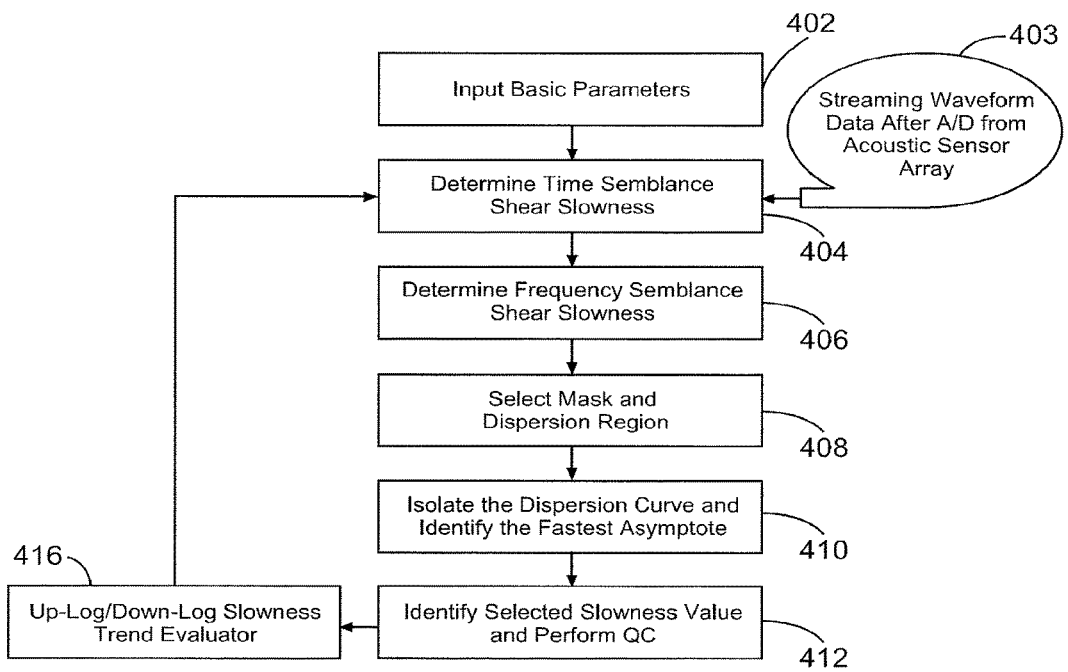
FIG. 4 depicts a flow chart of method steps in accordance with an illustrative embodiment of the present disclosure.

FIG. 4 depicts a flow chart of method steps in accordance with an exemplary embodiment of the present disclosure. Once an acoustic tool is directed to a zone of interest, it generates an acoustic signal. At step 402, the basic parameters regarding the particular application are supplied as an input to the system. For instance, the basic parameters may be supplied to a processing center within the system. In certain embodiments, the processing center may be part of an acoustic tool. In certain implementations, the processing center may be an information handling system (not shown) that includes machine readable instructions to perform the methods disclosed herein. These basic parameters may include, but are not limited to, STC process slowness values, wellbore diameter, fluid properties, etc.

Next, at step 403, the time domain waveform data after analog to digital conversion (A/D) from an acoustic sensor array is fed to the algorithm for shear slowness estimation. At step 404, the time domain waveform data is used in STC processing to determine the time semblance shear slowness. Next, at step 406, frequency semblance shear slowness may be determined.

At step 408 the appropriate mask and dispersion region may be selected. In certain implementations, the appropriate mask may be selected based on the particular input parameters, the determined time semblance shear slowness and/or the determined frequency semblance shear slowness. Next, at step 410, the dispersion curve may be isolated utilizing frequency domain array processing and using the selected mask. Additionally, the fastest asymptote of the isolated dispersion curve may be identified. The frequency domain array processing may be based on a real time application or a post processing application. In real-time applications, the frequency domain array processing may be from a streaming waveform data after an A/D conversion from an acoustic sensor array. In contrast, in a post processing application, the frequency domain array processing may utilize a stored waveform from any acoustic array tool. The frequency domain array processing may utilize any suitable frequency domain dispersion analysis including, but not limited to, point-to-point slowness phase coherence, slowness frequency semblance, Matrix Pencil, MUSIC, etc. Such methods are well known to those of ordinary skill in the art, with the benefit of this disclosure and will therefore not be discussed in detail herein.

Following the isolation of the dispersion curve at step 410, a least square fit algorithm may be used to determine a threshold value, both in frequency and slowness variation, with respect to normal dispersion behavior. This deviation happens mostly because of the presence of noise on data. Thereafter, the most flat portion of the dispersion curve at the lower frequency region and proximate to STC process slowness value is identified as a selected shear slowness value at step 412. The selected shear slowness value is a predicted shear slowness of the formation. The frequency value at which the shear slowness has been selected may be compared with the model based cut-off frequency value. The nature of flatness of the shear slowness values with respect to normal at lower frequency regions may also be determined. The term "nature of flatness" refers to the flatness with respect to a horizontal line. In an ideal setting, after cutoff frequency, the curve will trend flat (e.g., see FIG. 2A, the solid line trends flat for frequencies lower than 2 kHz). The selected slowness value and the frequency value corresponding to the selected slowness value (referred to herein as the "picked frequency") produce the quality control (QC) of the predicted slowness value. Specifically, the picked frequency and its trend is compared with the model based cutoff frequency. The smoothness of slowness values close to the picked frequency in vertical and horizontal axis may be determined. These two (picked frequency and slowness smoothness within the defined zone) are the main parameters to define the QC of the picked slowness. Specifically, from the theoretical computation using modal analysis, one can presume the cutoff frequency where the flexural slowness is close to the formation shear. QCs are the deviations of the picked frequency from the theoretical cut-off frequency and the slowness smoothness (or slowness flatness) properties described above.

Specifically, slowness logs developed at steps 404-412 and QC of the predicted slowness value are used to evaluate the slowness trend. Accordingly, at step 416 the identified slowness and QC values are used to compare the values with Up/Down log trend values and modify the mask accordingly. For example, if the slowness trend is up, then the mask selection will be moved towards slow formation. Specifically, the slowness trend is up if the calculated slowness is increasing with depth. In contrast, if the slowness trend is down, then the mask selection will be moved towards the fast formation. The slowness trend is down if the calculated slowness decreases with depth. The process then returns to step 404 for the next depth STC slowness estimation. In the process of STC slowness selection discussed above in conjunction with FIG. 4, the trend value may be used to select the slowness at the right STC zone.

Figure 5:
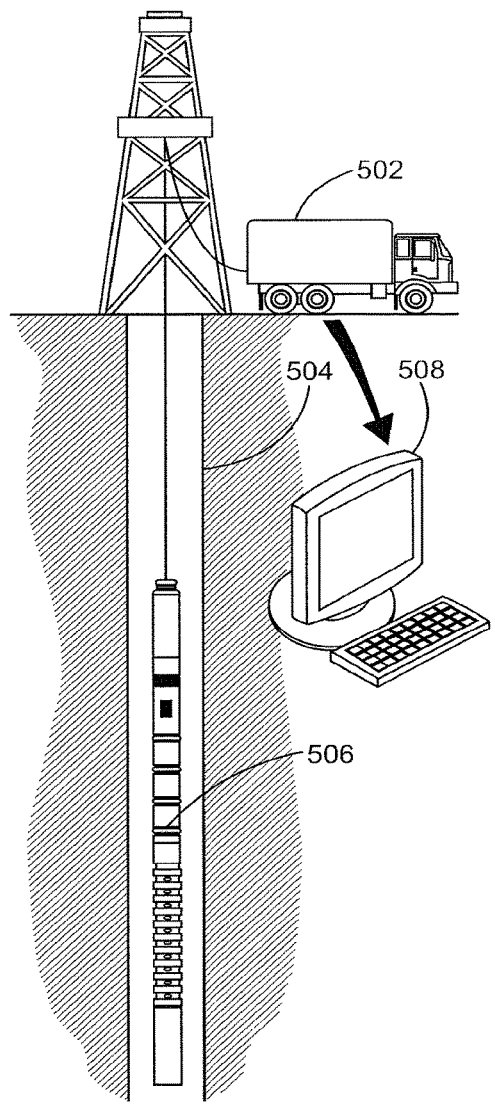
FIG. 5 depicts a system for performing subterranean operations in accordance with an illustrative embodiment of the present disclosure.
Figure 6:
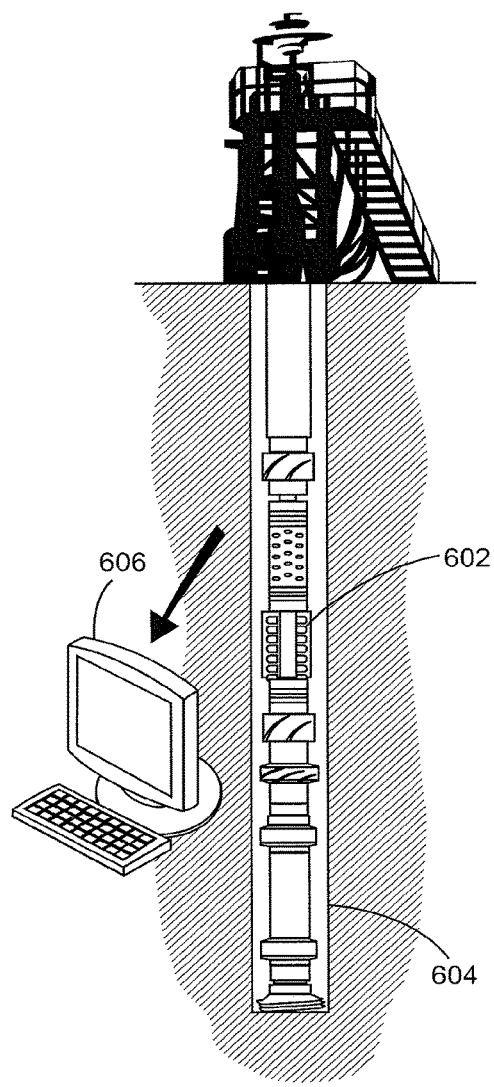
FIG. 6 depicts a system for performing subterranean operations in accordance with another illustrative embodiment of the present disclosure.

FIGS. 5 and 6 depict exemplary application platforms for the methods disclosed herein. Specifically, a central information handling system may include a computer-readable medium with machine readable instructions to perform the methods disclosed herein.

As shown in FIG. 5, in one exemplary embodiment, a logging truck 502 is positioned near the wellbore 504. An acoustic logging tool such as a wireline tool 506 may be sent downhole from the logging truck 502 to a desired location in the formation. In certain implementations, the wireline tool 506 may be, for example, the WaveSonic® tool available from Halliburton Energy Services, Inc. The wireline tool 506 may then measure a number of formation properties such as fast and slow shear wave travel times, P-wave slowness, compressive fluids in pore space, and anisotropy orientation. This information may undergo real-time processing in the logging truck 502. Logging truck 502 may provide a complete data-acquisition system including an information handling system that processes data. Specifically, the logging truck 502 may receive data from the wireline tool 506 and process it in accordance with the methods disclosed herein in conjunction with FIG. 4. In certain implementations, the logging truck 502 (and/or the wireline tool 506) may be communicatively coupled to an information handling system 508. The information handling system 508 may include a computer-readable medium with machine readable instructions to perform the methods disclosed herein. Accordingly, following the real-time processing of data, the wireline logging truck 502 may communicate the information to the information handling system 508 where the information undergoes post processing in accordance with the methods disclosed herein.

FIG. 6 depicts another exemplary embodiment of the present disclosure. In this implementation, the acoustic logging tool may be a LWD tool 602. Specifically, a LWD tool 602 such as, for example, the BAT® tool may be directed downhole through the wellbore 604. The LWD tool 602 may then be used to obtain measurements from the formation. In one embodiment, the LWD tool 602 may include an information handling system therein to perform real-time processing of the gathered information. The information handling system of the LWD tool 602 may be communicatively coupled to another information handling system 606. Accordingly, the logging tool 602 may communicate the information after performing real-time processing to the information handling system 606. The information handling system 606 may then perform post-processing on the obtained information in accordance with an embodiment of the present disclosure. Specifically, the information handling system may include a computer-readable medium which contains machine readable instructions to perform the methods disclosed herein.

Example

Figure 7A:
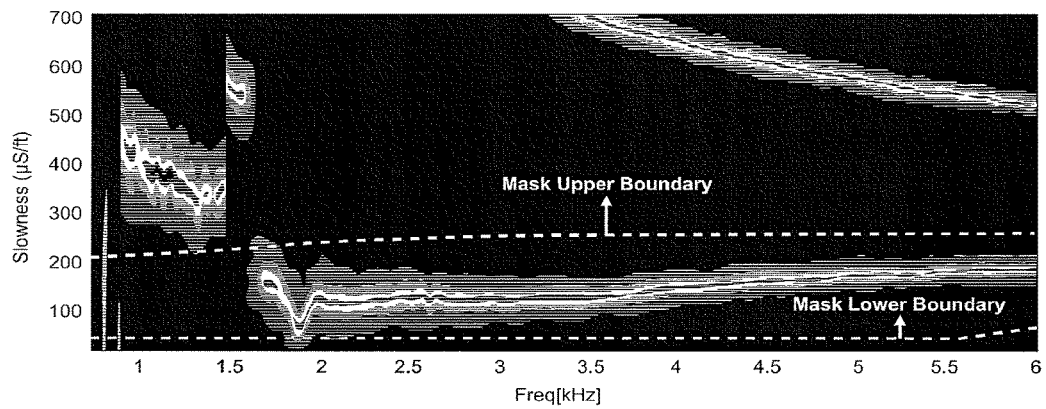
FIG. 7A depicts a frequency coherence image of a dipole source generated acoustic data and the zone of masking including a mask upper boundary and a mask lower boundary.
Figure 7B:
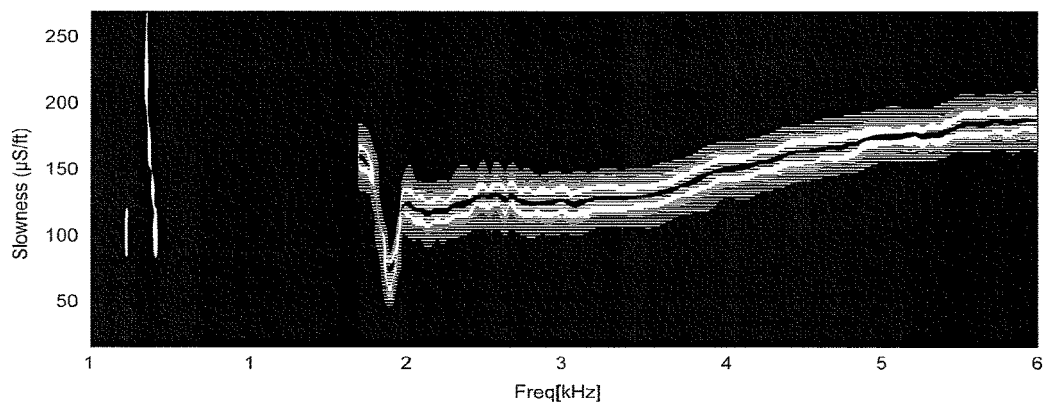
FIG. 7B depicts the frequency coherence image of FIG. 7A after applying a mask developed for an intermediate formation in accordance with embodiments of the present disclosure.
Figure 7C:
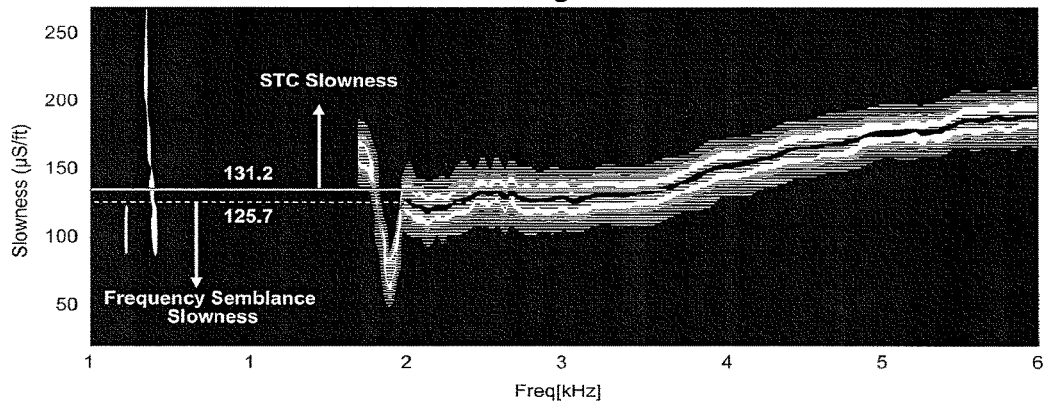
FIG. 7C depicts the final image of slowness selection, where the slowness values which are affected by noise have been eliminated and the slowness value has been selected at the maximum flat portion of the frequency slowness curve at low frequency range.

FIGS. 7A-C depict an illustration of the application of the methods disclosed herein to real data for an intermediate formation from a Test Well in Fort Worth, Tex. FIG. 7A depicts the frequency coherence image of a dipole source generated acoustic data and the zone of masking including a mask upper boundary and a mask lower boundary. FIG. 7B depicts the frequency coherence image after applying a mask developed for an intermediate formation in accordance with embodiments of the present disclosure. In FIG. 7B the black line (identified by arrows) indicates the slowness value at a given frequency and produces the shear wave dispersion curve of the formation of interest. FIG. 7C depicts the final image of slowness selection, where the slowness values which are affected by noise have been eliminated (as indicated by the white arrows in FIG. 7C) and the slowness value has been selected at the maximum flat portion of the frequency slowness curve at low frequency range. The final slowness result, including a time semblance (STC) shear slowness of 131.2 µs/ft and a frequency semblance shear slowness of 125.7 µs/ft, can then be determined in accordance with the methods disclosed herein.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A method of estimating properties of a formation using acoustic array processing comprising:
   directing an acoustic tool to a zone of interest in the formation;
   generating a first signal with the acoustic tool;
   determining a time semblance shear slowness using one or more basic parameters selected from a group consisting of parameters relating to the acoustic tool and parameters relating to the zone of interest;
   determining a frequency semblance shear slowness using the basic parameters;
   selecting a mask using the determined time semblance and frequency semblance shear slowness;
   isolating a dispersion curve from real data using the selected mask;
   selecting a shear slowness value from the isolated dispersion curve; and
   producing a quality control of a predicted shear slowness value, wherein producing the quality control is based on the selected shear slowness value and a frequency value corresponding to the selected shear slowness value.

2. The method of claim 1, wherein selecting the shear slowness value from the dispersion curve comprises identifying a flat portion of the dispersion curve from a model-based cut-off frequency region.

3. The method of claim 1, wherein performing quality control on the selected shear slowness value comprises comparing a picked frequency with a model-based cutoff frequency value.

4. The method of claim 1, further comprising evaluating a slowness trend using the selected shear slowness.

5. The method of claim 1, further comprising receiving real data with the acoustic tool, wherein the real data corresponds to the first signal generated by the acoustic tool, wherein the acoustic tool comprises a transmitter and a receiver, wherein the transmitter generates the first signal and wherein the receiver receives the real data.

6. The method of claim 1, further comprising receiving real data with the acoustic tool, wherein the real data corresponds to the first signal generated by the acoustic tool and wherein the mask isolates a dispersion curve from the real data.

7. The method of claim 1, wherein the parameters relating to the zone of interest are selected from a group consisting of formation properties, wellbore diameter, and wellbore fluid properties.

8. An information handling system having a computer-readable medium with machine readable instructions to:
direct an acoustic tool to a zone of interest in a formation;
generate a first signal by the acoustic tool;
determine a time semblance shear slowness using one or more basic parameters selected from a group consisting of parameters relating to the acoustic tool and parameters relating to the zone of interest;
determine a frequency semblance shear slowness using the basic parameters;
select a mask using the determined time semblance and frequency semblance shear slowness;
isolate a dispersion curve from real data using the selected mask;
select a shear slowness value from the isolated dispersion curve; and
produce a quality control of a predicted shear slowness value, wherein producing the quality control is based on the selected shear slowness value and a frequency value corresponding to the selected shear slowness value.

9. The information handling system of claim 8, wherein selecting the shear slowness value from the dispersion curve comprises identifying a flat portion of the dispersion curve.

10. The information handling system of claim 8, wherein performing quality control on the selected shear slowness value comprises comparing a picked frequency with a model-based cutoff frequency value.

11. The information handling system of claim 8, further comprising machine readable instructions to evaluate a slowness trend using a previous shear slowness value.

12. The information handling system of claim 8, wherein the acoustic tool comprises a transmitter and a receiver, wherein the transmitter generates the first signal and wherein the receiver receives the real data.

13. The information handling system of claim 8, further comprising machine readable instructions to receive real data, wherein the real data corresponds to the first signal generated by the acoustic tool, and wherein the mask isolates an appropriate dispersion curve from the real data.

14. The information handling system of claim 8, wherein the parameters relating to the zone of interest are selected from a group consisting of formation properties, wellbore diameter, and fluid properties.

15. A system for estimating properties of a formation using acoustic array processing comprising:
an acoustic tool directed to a zone of interest in the formation, the acoustic tool having a transmitter and a receiver,
wherein the transmitter transmits a first signal, and
wherein the receiver receives real data corresponding to the first signal;
an information handling system communicatively coupled to the acoustic tool,
wherein one or more basic parameters are input into the information handling system,
wherein the basic parameters are parameters selected from a group consisting of parameters relating to the acoustic tool and parameters relating to the zone of interest,
wherein the information handling system determines a time semblance shear slowness using the basic parameters,
wherein the information handling system determines a frequency semblance shear slowness using the basic parameters,
wherein the information handling system selects a mask using the determined time semblance and frequency semblance shear slowness,
wherein the information handling system isolates a dispersion curve from real data using the selected mask and selects a shear slowness value from the isolated dispersion curve, and
wherein the information handling system produces a quality control of a predicted shear slowness value, wherein producing the quality control is based on the selected shear slowness value and a frequency value corresponding to the selected shear slowness value.

16. The system of claim 15, wherein selecting the shear slowness value from the dispersion curve comprises identifying a flat portion of the dispersion curve.

17. The system of claim 15, wherein performing quality control on the selected shear slowness value comprises comparing a picked frequency with a model-based cutoff frequency value.

18. The system of claim 15, wherein the information handling system evaluates a slowness trend using a previous shear slowness value.

19. The system of claim 15, wherein the parameters relating to the zone of interest are selected from a group consisting of formation properties, wellbore diameter, and fluid properties.

20. The system of claim 15, wherein the mask isolates an appropriate dispersion curve from the real data.

* * * * *